United States Patent
Dani et al.

(10) Patent No.: US 9,762,585 B2
(45) Date of Patent: Sep. 12, 2017

(54) TENANT LOCKBOX

(71) Applicant: Microsoft Technology Licensing, LLC., Redmond, WA (US)

(72) Inventors: Rajalakshmi Dani, Redmond, WA (US); Anand Madhava Menon, Redmond, WA (US); Paul H. Rich, Seattle, WA (US); Naveen Madan, Bothell, WA (US); Vikas Ahuja, Sammamish, WA (US); Siddhartha Mathur, Sammamish, WA (US); Liqiang Zhu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/663,082

(22) Filed: Mar. 19, 2015

(65) Prior Publication Data

US 2016/0277411 A1    Sep. 22, 2016

(51) Int. Cl.
*G06F 21/62* (2013.01)
*H04L 29/06* (2006.01)
*G06F 21/60* (2013.01)

(52) U.S. Cl.
CPC .......... *H04L 63/102* (2013.01); *G06F 21/604* (2013.01); *H04L 63/08* (2013.01); *H04L 63/20* (2013.01)

(58) Field of Classification Search
CPC .... H04L 63/63102; H04L 63/08; H04L 63/20

(Continued)

(56) References Cited

U.S. PATENT DOCUMENTS 5,423,044 A    6/1995  Sutton et al.
5,564,016 A    10/1996 Korenshtein (Continued)

FOREIGN PATENT DOCUMENTS

CN    1794717       6/2006
CN    102571703 A   7/2012
CN    102571821 A   7/2012

OTHER PUBLICATIONS

Shwartz, Ifat, "Let's Get Rolling—The New Roles and Authorizations in SAP HANA Cloud Portal", Published on: Jun. 18, 2014 Available at: http://scn.sap.com/community/hana-cloud-portal/blog/2014/06/18/the-new-roles-and-authorizations-in-sap-hana-cloud-portal.

(Continued)

*Primary Examiner* — Amir Mehrmanesh
*Assistant Examiner* — Sakinah Taylor

(57) ABSTRACT

Tenant approval for operator access to tenant data is provided. In order to grant service personnel operators access to a tenant's data for performing a requested action, a lockbox determines a security group role to which an operator needs to be elevated to perform a requested action, computes a set of internal administrators and tenant administrators authorized to grant a temporary role elevation, and sends an access control request to the administrators. Upon receiving approval of the access control request from an internal administrator and a tenant administrator, the lockbox elevates the operator to the security group role, granting the operator a set of permissions needed in order to allow the operator to perform the requested action. Accordingly, tenants are enabled to control access to their data and scrutinize access requests per their company procedures and compliance needs.

20 Claims, 7 Drawing Sheets

(58) Field of Classification Search
USPC .......................................................... 726/1
See application file for complete search history.

(56) References Cited

U.S. PATENT DOCUMENTS

| | | | |
|---|---|---|---|
| 5,911,143 A | 6/1999 | Deinhart et al. | |
| 6,151,643 A | 11/2000 | Cheng et al. | |
| 6,335,972 B1 | 1/2002 | Chandersekaran | |
| 6,510,513 B1 | 1/2003 | Danieli | |
| 6,526,513 B1 | 2/2003 | Shrader | |
| 6,678,826 B1 | 1/2004 | Kelly et al. | |
| 6,694,437 B1 | 2/2004 | Pao et al. | |
| 6,804,773 B1 | 10/2004 | Grigsby et al. | |
| 6,978,367 B1 | 12/2005 | Hind et al. | |
| 7,205,883 B2 | 4/2007 | Bailey | |
| 7,257,713 B2 | 8/2007 | Colvig et al. | |
| 7,426,654 B2 | 9/2008 | Adams, Jr. et al. | |
| 7,496,191 B1 | 2/2009 | Crews | |
| 7,506,364 B2 | 3/2009 | Vayman | |
| 7,526,685 B2 | 4/2009 | Noy et al. | |
| 7,607,164 B2 | 10/2009 | Vasishth | |
| 7,630,480 B2 | 12/2009 | Fleck et al. | |
| 7,644,285 B1 | 1/2010 | Murray | |
| 7,680,822 B1 | 3/2010 | Vyas et al. | |
| 7,698,430 B2 | 4/2010 | Jackson | |
| 7,702,736 B2 | 4/2010 | Ouchi | |
| 7,734,670 B2 | 6/2010 | Poozhiyil et al. | |
| 7,815,106 B1 | 10/2010 | McConnell | |
| 7,831,833 B2 | 11/2010 | Gaylor et al. | |
| 7,950,051 B1 | 5/2011 | Spitz et al. | |
| 7,992,008 B2 | 8/2011 | Ashok et al. | |
| 8,046,558 B2 | 10/2011 | Ghose | |
| 8,195,488 B1 | 6/2012 | Taix et al. | |
| 8,201,224 B1 | 6/2012 | Spertus | |
| 8,244,549 B1 | 8/2012 | Stener | |
| 8,296,827 B2 | 10/2012 | Paganetti et al. | |
| 8,310,923 B2 | 11/2012 | Nordstrom et al. | |
| 8,312,516 B1 | 11/2012 | Malatesta | |
| 8,438,647 B2 | 5/2013 | Jevans | |
| 8,458,455 B2 | 6/2013 | Anderson et al. | |
| 8,458,779 B2 | 6/2013 | Valentine et al. | |
| 8,769,622 B2 | 7/2014 | Chang et al. | |
| 8,769,644 B1 | 7/2014 | Eicken et al. | |
| 8,793,790 B2 | 7/2014 | Khurana et al. | |
| 8,839,257 B2 | 9/2014 | Lykyanov et al. | |
| 8,881,249 B2 | 11/2014 | Nunn et al. | |
| 9,105,009 B2 | 8/2015 | MacLead et al. | |
| 2001/0021926 A1 | 9/2001 | Schneck et al. | |
| 2002/0026592 A1 | 2/2002 | Gavrila et al. | |
| 2002/0035521 A1 | 3/2002 | Powers | |
| 2002/0147801 A1 | 10/2002 | Gullotta | |
| 2003/0037251 A1 | 2/2003 | Frieder et al. | |
| 2003/0088786 A1 | 5/2003 | Moran | |
| 2003/0115148 A1 | 6/2003 | Takhar | |
| 2003/0139962 A1 | 7/2003 | Nobrega et al. | |
| 2004/0088295 A1 | 5/2004 | Glazer | |
| 2004/0205342 A1 | 10/2004 | Roegner | |
| 2004/0230530 A1 | 11/2004 | Searl et al. | |
| 2005/0050354 A1 | 3/2005 | Gociman | |
| 2005/0154744 A1 | 7/2005 | Morinville | |
| 2005/0180573 A1 | 8/2005 | Pelly et al. | |
| 2005/0193041 A1 | 9/2005 | Bourbonnais et al. | |
| 2005/0204143 A1 | 9/2005 | Ellington | |
| 2006/0005048 A1 | 1/2006 | Osaki et al. | |
| 2006/0048224 A1 | 3/2006 | Duncan et al. | |
| 2006/0075144 A1 | 4/2006 | Challener et al. | |
| 2006/0075464 A1 | 4/2006 | Golan | |
| 2006/0137007 A1 | 6/2006 | Paatero et al. | |
| 2006/0168079 A1 | 7/2006 | Shen et al. | |
| 2006/0184675 A1 | 8/2006 | Salmre et al. | |
| 2006/0242690 A1 | 10/2006 | Wolf et al. | |
| 2006/0265599 A1 | 11/2006 | Kanai | |
| 2007/0028293 A1 | 2/2007 | Boerries et al. | |
| 2007/0083928 A1 | 4/2007 | Mattsson | |
| 2007/0094334 A1 | 4/2007 | Hoffman et al. | |
| 2007/0101434 A1 | 5/2007 | Jevans | |
| 2007/0124361 A1 | 5/2007 | Lowry et al. | |
| 2007/0143851 A1 | 6/2007 | Nicodemus et al. | |
| 2007/0180100 A1 | 8/2007 | Biggs et al. | |
| 2007/0185875 A1 | 8/2007 | Chang et al. | |
| 2007/0192416 A1 | 8/2007 | Gupta | |
| 2007/0244899 A1 | 10/2007 | Faitelson | |
| 2007/0250920 A1 | 10/2007 | Lindsay | |
| 2007/0266006 A1 | 11/2007 | Buss | |
| 2007/0289019 A1 | 12/2007 | Lowrey | |
| 2007/0294258 A1 | 12/2007 | Caldwell et al. | |
| 2008/0098485 A1 | 4/2008 | Chiou | |
| 2008/0103916 A1 | 5/2008 | Camarador et al. | |
| 2008/0123854 A1 | 5/2008 | Peel et al. | |
| 2008/0127354 A1 | 5/2008 | Carpenter | |
| 2008/0140778 A1 | 6/2008 | Banaver et al. | |
| 2008/0154774 A1 | 6/2008 | Dennison et al. | |
| 2008/0155685 A1 | 6/2008 | Beilinson et al. | |
| 2008/0168532 A1 | 7/2008 | Carter et al. | |
| 2008/0195936 A1 | 8/2008 | White et al. | |
| 2008/0222734 A1 | 9/2008 | Redlich | |
| 2008/0276098 A1 | 11/2008 | Florencio et al. | |
| 2008/0287121 A1 | 11/2008 | Ebrom et al. | |
| 2008/0320310 A1 | 12/2008 | Florencio et al. | |
| 2009/0048881 A1 | 2/2009 | Keane et al. | |
| 2009/0055822 A1 | 2/2009 | Tolman et al. | |
| 2009/0094667 A1 | 4/2009 | Habeck et al. | |
| 2009/0104888 A1 | 4/2009 | Cox | |
| 2009/0119541 A1 | 5/2009 | Inoue et al. | |
| 2009/0193407 A1 | 7/2009 | Lepeska | |
| 2009/0210427 A1 | 8/2009 | Elder et al. | |
| 2009/0249284 A1 | 10/2009 | Antosz et al. | |
| 2009/0271451 A1 | 10/2009 | Young et al. | |
| 2009/0319402 A1 | 12/2009 | Manista et al. | |
| 2009/0320088 A1 | 12/2009 | Gill et al. | |
| 2009/0320107 A1 | 12/2009 | Corella | |
| 2009/0328023 A1 | 12/2009 | Bestland et al. | |
| 2010/0005510 A1 | 1/2010 | Weber et al. | |
| 2010/0011418 A1 | 1/2010 | Despain et al. | |
| 2010/0017589 A1 | 1/2010 | Reed et al. | |
| 2010/0023368 A1 | 1/2010 | Houba | |
| 2010/0031058 A1 | 2/2010 | Kito et al. | |
| 2010/0037056 A1 | 2/2010 | Follis et al. | |
| 2010/0063950 A1 | 3/2010 | Joshi et al. | |
| 2010/0064072 A1 | 3/2010 | Tang et al. | |
| 2010/0087941 A1 | 4/2010 | Assaf et al. | |
| 2010/0091318 A1 | 4/2010 | Ferlitsch | |
| 2010/0169630 A1 | 7/2010 | Mirashrafi et al. | |
| 2010/0185451 A1 | 7/2010 | Choi et al. | |
| 2010/0188287 A1 | 7/2010 | Madsen et al. | |
| 2010/0205421 A1 | 8/2010 | Campbell et al. | |
| 2010/0212008 A1 | 8/2010 | Jaganathan et al. | |
| 2010/0218012 A1 | 8/2010 | Josheph et al. | |
| 2010/0242041 A1 | 9/2010 | Plondke et al. | |
| 2010/0250939 A1 | 9/2010 | Adams et al. | |
| 2010/0257346 A1 | 10/2010 | Sosnosky et al. | |
| 2010/0257579 A1 | 10/2010 | Karjoth et al. | |
| 2010/0257596 A1 | 10/2010 | Ngo et al. | |
| 2010/0278078 A1 | 11/2010 | Proulx et al. | |
| 2010/0281546 A1 | 11/2010 | Kruse | |
| 2010/0287597 A1 | 11/2010 | Richins | |
| 2010/0306376 A1* | 12/2010 | Ward | H04L 63/104 709/225 |
| 2011/0023107 A1 | 1/2011 | Chen et al. | |
| 2011/0061093 A1 | 3/2011 | Korkus et al. | |
| 2011/0078497 A1 | 3/2011 | Lyne et al. | |
| 2011/0099202 A1 | 4/2011 | Dedeoglu | |
| 2011/0099552 A1 | 4/2011 | Avni et al. | |
| 2011/0099616 A1 | 4/2011 | Mazur et al. | |
| 2011/0126111 A1 | 5/2011 | Gill et al. | |
| 2011/0126168 A1 | 5/2011 | Ilyayev | |
| 2011/0191254 A1 | 8/2011 | Womack | |
| 2011/0209194 A1 | 8/2011 | Kennedy et al. | |
| 2011/0219434 A1 | 9/2011 | Betz et al. | |
| 2011/0246426 A1 | 10/2011 | Cho | |
| 2011/0247066 A1 | 10/2011 | Lee | |
| 2011/0252404 A1 | 10/2011 | Park et al. | |
| 2011/0277017 A1 | 11/2011 | Invanov et al. | |
| 2011/0289588 A1 | 11/2011 | Sahai et al. | |

(56) References Cited

U.S. PATENT DOCUMENTS

| | | | |
|---|---|---|---|
| 2011/0302632 | A1 | 12/2011 | Garrett et al. |
| 2012/0016621 | A1 | 1/2012 | Tan et al. |
| 2012/0096306 | A1 | 4/2012 | Akirav et al. |
| 2012/0110055 | A1 | 5/2012 | Van Biljon et al. |
| 2012/0137360 | A1 | 5/2012 | Henderson |
| 2012/0144234 | A1 | 6/2012 | Clark et al. |
| 2012/0185911 | A1 | 7/2012 | Polite et al. |
| 2012/0185933 | A1 | 7/2012 | Belk et al. |
| 2012/0209884 | A1 | 8/2012 | Mattson et al. |
| 2012/0239822 | A1 | 9/2012 | Poulson et al. |
| 2012/0246703 | A1 | 9/2012 | MacLeod et al. |
| 2012/0259720 | A1 | 10/2012 | Nuzzi |
| 2012/0266246 | A1 | 10/2012 | Amit et al. |
| 2012/0317132 | A1 | 12/2012 | Brady et al. |
| 2013/0024918 | A1 | 1/2013 | Cramer et al. |
| 2013/0024947 | A1 | 1/2013 | Holland et al. |
| 2013/0031070 | A1 | 1/2013 | Ducharme et al. |
| 2013/0047230 | A1 | 2/2013 | Krishnan et al. |
| 2013/0111260 | A1 | 5/2013 | Reddy et al. |
| 2013/0132963 | A1 | 5/2013 | Lukyanov et al. |
| 2013/0133024 | A1 | 5/2013 | MacLeod et al. |
| 2013/0239166 | A1 | 9/2013 | MacLeod et al. |
| 2013/0276142 | A1* | 10/2013 | Peddada .......... G06F 21/62 726/28 |
| 2014/0006580 | A1 | 1/2014 | Raghu et al. |
| 2014/0020072 | A1 | 1/2014 | Thomas |
| 2014/0040999 | A1 | 2/2014 | Zhang et al. |
| 2014/0075568 | A1 | 3/2014 | Sathyadevan et al. |
| 2014/0089674 | A1 | 3/2014 | Buehl |
| 2014/0165167 | A1* | 6/2014 | Nunn .......... G06F 21/45 726/6 |
| 2015/0271200 | A1* | 9/2015 | Brady .......... H04L 63/1416 726/4 |
| 2016/0364576 | A1 | 12/2016 | MacLeod et al. |

OTHER PUBLICATIONS

PCT International Search Report and Written Opinion Issued in Application No. PCT/US2016/022999, Mailed Date: May 30, 2016, 11 Pages.
U.S. Appl. No. 13/052,788 Amendment and Response filed Aug. 19, 2014, 13 pages.
U.S. Appl. No. 13/052,788 Amendment and Response filed Dec. 9, 2014, 13 pages.
U.S. Appl. No. 13/052,788 Amendment and Response filed Feb. 28, 2013, 13 pages.
U.S. Appl. No. 13/052,788 Amendment and Response filed Mar. 17, 2014, 12 pages.
U.S. Appl. No. 13/052,788 Amendment and Response filed Mar. 23, 2015, 15 pages.
U.S. Appl. No. 13/052,788 Amendment and Response filed Oct. 2, 2013, 10 pages.
U.S. Appl. No. 13/052,788 Notice of Allowance mailed Apr. 1, 2015, 8 pages.
U.S. Appl. No. 13/052,788 Notice of Allowance mailed Jul. 7, 2015, 2 pages.
U.S. Appl. No. 13/052,788 Office Action mailed Dec. 17, 2013, 18 pages.
U.S. Appl. No. 13/052,788 Office Action mailed Dec. 22, 2014, 21 pages.
U.S. Appl. No. 13/052,788 Office Action mailed Jul. 2, 2013, 20 pages.
U.S. Appl. No. 13/052,788 Office Action mailed May 20, 2014, 21 pages.
U.S. Appl. No. 13/052,788 Office Action mailed Nov. 30, 2012, 18 pages.
U.S. Appl. No. 13/052,788 Office Action mailed Sep. 9, 2014, 20 pages.
U.S. Appl. No. 13/154,660 Amendment and Response filed Aug. 2, 2013, 12 pages.
U.S. Appl. No. 13/154,660 Amendment and Response filed Dec. 18, 2013, 11 pages.
U.S. Appl. No. 13/154,660 Amendment and Response filed Jan. 31, 2013, 14 pages.
U.S. Appl. No. 13/154,660 Amendment and Response filed Jan. 4, 2016, Jan. 4, 2016, 11 pages.
U.S. Appl. No. 13/154,660 Amendment and Response filed Jan. 8, 2015, 14 pages.
U.S. Appl. No. 13/154,660 Amendment and Response filed Jul. 23, 2015, 13 pages.
U.S. Appl. No. 13/154,660 Amendment and Response filed Jun. 24, 2014, 12 pages.
U.S. Appl. No. 13/154,660 Office Action mailed Mar. 24, 2014, 17 pages.
U.S. Appl. No. 13/154,660 Office Action mailed Mar. 24, 2016, 21 pages.
U.S. Appl. No. 13/154,660 Office Action mailed Mar. 25, 2015, 20 pages.
U.S. Appl. No. 13/154,660 Office Action mailed May 2, 2013, 17 pages.
U.S. Appl. No. 13/154,660 Office Action mailed Nov. 1, 2012, 14 pages.
U.S. Appl. No. 13/154,660 Office Action mailed Oct. 1, 2015, 19 pages.
U.S. Appl. No. 13/154,660 Office Action mailed Sep. 30, 2013, 16 pages.
U.S. Appl. No. 13/154,660 Office Action mailed Sep. 8, 2014, 18 pages.
U.S. Appl. No. 13/301,872 Amendment and Response filed Apr. 15, 2013, 14 pages.
U.S. Appl. No. 13/301,872 Amendment and Response filed Aug. 28, 2015, 17 pages.
U.S. Appl. No. 13/301,872 Amendment and Response filed Dec. 30, 2013, 13 pages.
U.S. Appl. No. 13/301,872 Amendment and Response filed Jan. 26, 2015, 17 pages.
U.S. Appl. No. 13/301,872 Amendment and Response filed Jul. 21, 2014, 14 pages.
U.S. Appl. No. 13/301,872 Office Action mailed Apr. 22, 2014, 42 pages.
U.S. Appl. No. 13/301,872 Office Action mailed Aug. 27, 2014, 39 pages.
U.S. Appl. No. 13/301,872 Office Action mailed Jan. 14, 2013, 22 pages.
U.S. Appl. No. 13/301,872 Office Action mailed Jun. 25, 2015, 37 pages.
U.S. Appl. No. 13/301,872 Office Action mailed Nov. 6, 2015, 38 pages.
U.S. Appl. No. 13/301,872 Office Action mailed Sep. 30, 2013, 34 pages.
U.S. Appl. No. 13/302,064 Amendment and Response filed Mar. 4, 2014, 14 pages.
U.S. Appl. No. 13/302,064 Notice of Allowance mailed Aug. 12, 2014, 2 pages.
U.S. Appl. No. 13/302,064 Notice of Allowance mailed May 12, 2014, 17 pages.
U.S. Appl. No. 13/302,064 Office Action mailed Jan. 30, 2014, 22 pages.
U.S. Appl. No. 13/413,078 Amendment and Response filed Jul. 15, 2013, 17 pages.
U.S. Appl. No. 13/413,078 Amendment and Response filed May 23, 2014, 14 pages.
U.S. Appl. No. 13/413,078 Amendment and Response filed Apr. 22, 2016, 4 pages.
U.S. Appl. No. 13/413,078 Amendment and Response filed Dec. 24, 2013, 18 pages.
U.S. Appl. No. 13/413,078 Amendment and Response filed Mar. 31, 2015, 21 pages.
U.S. Appl. No. 13/413,078 Amendment and Response filed Nov. 5, 2014, 21 pages.
"Automating IT: SCSM, SCCM, SCOM, SCVMM, Opalis—Better Together"—Retrieved Date: Oct. 3, 2011. Available at: http://blogs.

(56) References Cited

OTHER PUBLICATIONS technet.com/b/servicemanager/archive/2010/08/25/automating-it-scsm-scom-scvmm-opalis-better-together.aspx.
"BMC Remedy Change Management 7.0 User's Guide"—Published Date: Jun. 2006; 410 pages. Available at: http://idbdocs.iadb.org/wsdocs/getdocument.aspx?docnum=35595995.
"Change Management Process" Version 1.0—Published Date: May 1, 2006. Available at: http://its.uncg.edu/Service_Management/Change/ChangeManagementProcess.pdf.
"Deployment Planning, Architecture, and Guidance on System Center Service Manager"—Retrieved Date: Oct. 4, 2011. Available at: http://technet.microsoft.com/en-us/library/gg281359.aspx.
"IBM Tivoli Business Continuity Process Manager"—Retrieved Date: Oct. 4, 2011. Available at: http://www-01.ibm.com/software/tivoli/products/business-continuity-process-mgr/features.html.
Batishchev, Alexander, M. article entitled, "Getting Elevated privileges on Demand Using C#," published Sep. 9, 2010; 4 pages. Available at: http://www.codeproject.com/KB/vista-security/ElevatedPrivilegesDemand.aspx.
Chinese Office Action in Application 201210075174.5 mailed Mar. 3, 2016, 13 pages.
Chinese Office Action in Application 201210075174.5, mailed Nov. 1, 2016, 10 pages.
Chun-Ying Huang et al., Using one-time passwords to prevent password phishing attacks. J Network Computer Applications (2011), doi:10.1016/j.jnca. 2011.02.004, Journal of Network and Computer Applications, vol. 34, Issue 4, 10 pages.
Davis, "Using roles to secure your VMWare ESX Infrastructure", <http://www.virtualizationadmin.com/articles-tutorials/vmware-esx-and-vsphere-articles/general/using-roles-ecure-vmware-esx-infrastructure.html>, Jul. 14, 2009, 9 pages.
Dinei Florencio et al., One-Time Password Access to Any Server without Changing the Server, 11th International conference on Information Security '08, Taipei. Sep. 15, 2008, 16 pages.
Huhns, M., et al.: "Service-Oriented Computing: Key Concepts and Principles"; IEEE Internet Computing Jan./Feb. 2005, IEEE Computer Society; 7 pages.
Joseph Bonneau et al., The Quest to Replace Passwords: A Framework for Comparative Evaluation of Web Authentication Schemes, IEEE Symposium on Secuirty and Privacy (SP), 2012, May 20, 2012, 15 pages.=.
Kadar, et al, article entitled "Automatic Classification of Change Requests for Improved IT Service Quality"—Published Date: Feb. 29, 2011. In proceedings of Annual SRII Global Conference, Mar. 29, 2011, pp. 430-439. Available at: http://ieeexplore.ieee.org/stamp/stamp.jsp?tp=&arnumber=5958118.
Kaufman, Charlie, et al.; "Windows Azure™ Security Overview"; Published Aug. 2010; 24 pages., Obtained at: http://www.globalfoundationservices.com/security/documents/WindowsAzureSecurityOverview1_0Aug2010.pdf.
Lockbox. Printed Nov. 20, 2012. Lockbox: Technology Platform, 3 pages. http://www.lock-box.com/technology-platform.
Master Data Services Environment—Retrieved Date: Oct. 4, 2011, Available at: http://download.microsoft.com/download/5/9/F/59F1639E-EF57-4915-8848-EF1DC2157EBB/02%20MDS%20Environment.pdf.
Publication entitled, "PCI DSS Compliance in the UNIX/LINUX Datacenter Environment"; Published Aug. 2009 by BeyondTrust Corporation; 19 pages. Obtained at: http://i.zdnet.com/whitepapers/BeyondTrust_PCIDSSComplianceintheUNIXLinuxDatacenterEnvironment.pdf.
Response After Final Consideration Program Request filed Feb. 19, 2016 in U.S. Appl. No. 13/413,078.
Stanger, Mark; article entitled "Change Management Workflow Approval Scripts in Service-now.com" Published on Oct. 20, 2010. Available at: http://www.servicenowguru.com/scripting/change-management-workflow-approval-scripts-servicenowcom/.
Stoneware. Printed Nov. 21, 2012. Single Sign-on, 3 pages. http://www.stone-ware.com/webnetwork/lenovo/sso.
U.S. Appl. No. 13/413,078 Amendment and Response filed Oct. 19, 2015, 23 pages.
U.S. Appl. No. 13/413,078 Notice of Allowance mailed Mar. 17, 2016, 10 pages.
U.S. Appl. No. 13/413,078 Notice of Allowance mailed May 26, 2016, 13 pages.
U.S. Appl. No. 13/413,078 Office Action mailed Apr. 19, 2013, 33 pages.
U.S. Appl. No. 13/413,078 Office Action mailed Aug. 8, 2014, 38 pages.
U.S. Appl. No. 13/413,078 Office Action mailed Dec. 31, 2014, 31 pages.
U.S. Appl. No. 13/413,078 Office Action mailed Feb. 24, 2014, 39 pages.
U.S. Appl. No. 13/413,078 Office Action mailed Jun. 18, 2015, 39 pages.
U.S. Appl. No. 13/413,078 Office Action mailed Nov. 19, 2015, 43 pages.
U.S. Appl. No. 13/413,078 Office Action mailed Sep. 24, 2013, 37 pages.
U.S. Appl. No. 13/712,688 Amendment and Response filed Mar. 18, 2014, 12 pages.
U.S. Appl. No. 13/712,688 Amendment and Response filed Jul. 17, 2014, 6 pages.
U.S. Appl. No. 13/712,688 Notice of Allowance mailed Jun. 25, 2014, 11 pages.
U.S. Appl. No. 13/712,688 Office Action mailed Dec. 18, 2013, 9 pages.
Wright, T.; "System Center Service Manager 2010 Release Candidate Released!!"; Microsoft Corporation; Mar. 3, 2010; 3 pages.
Yu, "Data Security in Cloud Computing", 2012, Morgan Kaufmann/Elsevier, book section 15, pp. 389-410.
Chinese Notice of Allowance in Application 201210075714.5, dated Apr. 5, 2017, 4 pages.
PCT International Preliminary Report on Patentability in International Application PCT/US2016/022999, dated Jun. 21, 2017, 8 pages.

* cited by examiner

TENANT LOCKBOX

BACKGROUND

There are various scenarios in which support personnel need access to customer data for benefit of the customer, for example, when making a change in a system as a corrective action, or to perform invasive debugging of customer-specific issues. When accessing customer data, whether on-premise or on the cloud, there is a need for security measures. For example, in a Software as a Service (SaaS) or cloud service system, business-critical customer data is oftentimes stored in the cloud, where customers do not have complete control over access to their data. For example, various administrators, engineers, and other support personnel of the cloud service provider can gain access to customer's data via access control systems that are not controlled by the customer. Accordingly, such access to customer data that is invisible to customers subjects cloud service providers to increased scrutiny by customers, for example, customers may be concerned about why cloud service personnel are accessing customer data, how often cloud service personnel are accessing customer data, what level of background clearance and personnel standards are being required to access customer data, etc.

It is with respect to these and other considerations that examples have been made.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of the present disclosure are directed to providing tenant approval for operator access to tenant data. In order to provide a service personnel, herein referred to as an operator, permissions for granting the operator a temporary role elevation and allowing access to a tenant's data for performing a requested action, a lockbox computes the role needed by the operator for performing the requested action, a set of one or more internal administrators who are authorized to grant a temporary role elevation to the operator, and a set of one or more tenant administrators who are authorized to grant permission to allow the operator access to the tenant's data, and sends an access control request to the one or more internal and tenant administrators. Upon receiving an approval of the access control request from an internal administrator and a tenant administrator, the lockbox temporarily elevates the operator to the role, giving the operator a set of permissions to allow the operator to perform the requested action. According to aspects of the present disclosure, increased security is provided by enabling tenants to control access to their data and scrutinize access requests per their company procedures and compliance needs.

Examples may be implemented as a computer process, a computing system, or as an article of manufacture such as a computer program product or computer readable media. The computer program product may be a computer storage media readable by a computer system and encoding a computer program of instructions for executing a computer process. The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

Figure 1:
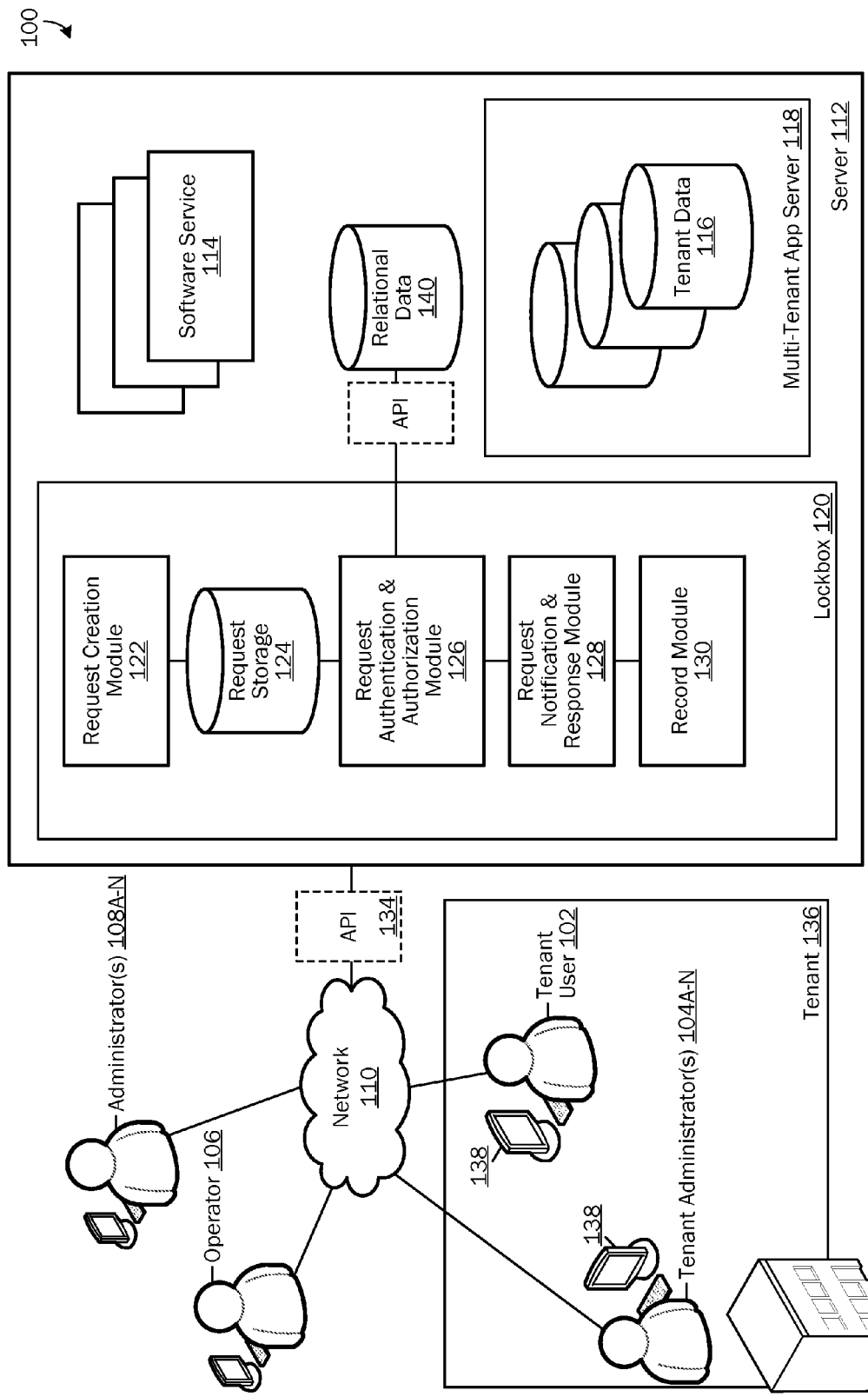
FIG. 1 is a simplified block diagram of one example of a tenant lockbox system.

The following detailed description refers to the accompanying drawings. Wherever possible, the same reference numbers are used in the drawings and the following description to refer to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

Aspects of a tenant lockbox system provide tenant-approval within an approval chain for workflow processes that grant service personnel access to the tenant's data. Accordingly, tenants are enabled to control access to their data, and scrutinize access request per their company procedures and compliance needs.

FIG. 1 is a simplified block diagram of one example of a tenant lockbox system 100. According to an aspect, components of the tenant lockbox system 100 operate as a distributed system, where each component is accessed via a suitable network. According to another aspect, various components of the system operate together as an integrated system. As illustrated, the tenant lockbox system 100 includes a server 112 comprising a lockbox engine 120, a plurality of software services 114A-N (collectively 114), and a plurality of tenant data storage components 116A-N (collectively 116). According to an aspect, the server 112 is operable to execute a plurality of other application and/or services that are not illustrated in FIG. 1.

According to an aspect, the software services 114 include one or more on-premise services, for example, where software applications are hosted in an on-premises data center (i.e., server 112). According to another aspect, the software services 114 include one or more cloud or web services. For example, a cloud service generally refers to a hosted service providing scalable processing and storage capabilities. For example, a cloud service oftentimes includes virtualized resources, such as a multi-tenant application server 118. The resources presented by cloud computing are provided as a service, where cloud computing customers rent usage of the resources (e.g., tenant data storage components 116) from a third-party provider that owns the physical infrastructure. As used herein, a client organization that is served by a cloud service and shares resources controlled or managed by the cloud service with other client organizations is referred to as a tenant 136.

According to an aspect, a web service is provided by or hosted by a cloud service. For example, a web service is a software system that supports interoperable machine-to-machine interaction over a network 110, and enables software to connect to other software applications. Tenant users 102 have access to application software and databases on the cloud, which manage infrastructures and platforms. Tenant users 102 are enabled to access the cloud service via entering a uniform resource locator (URL) in a browser application on client device 138. According to an aspect, when using a cloud service, a limited amount of data may be stored on the client device 138. Instead, data is stored on the infrastructure, "the cloud," (e.g., in tenant data storage components 116).

According to an aspect, the client device 138 includes any suitable computing device such as a desktop computer, laptop computer, tablet-style computer, handheld computing device, mobile communication device, gaming device, and the like. According to an aspect, the network 110 can include, but is not limited to, a cellular network (e.g., wireless phone), a point-to-point dial up connection, a satellite network, the Internet, a local area network (LAN), a wide area network (WAN), a WiFi network, an ad hoc network or a combination thereof. The network may include one or more connected networks (e.g., a multi-network environment) including public networks, such as the Internet, and/or private networks such as a secure enterprise private network. Access to the network 110 may be provided via one or more wired or wireless access networks as is understood by those skilled in the art.

According to an aspect, administrative access to systems used to provide software services 114 to tenants 136 are regulated to ensure there is no unauthorized access or exposure to user data. By default, service personnel, including operators 106 such as on-call engineers (OCEs) and one or more administrators 108A-N (collectively 108), who have access to operate the service, debug issues, or respond to escalations and incidents in the system are provided with configuration view-only permissions. At times, elevated access by the operator 106 is needed, for example, when making a change in the system as a corrective action or to perform invasive debugging of customer-specific issues. In order to get authorization for accessing servers 118 or tenant data 116, the operator 106 submits an access control request to the lockbox engine 120 that identifies the operator 106, the action that the operator 106 wants to perform, and the tenant 136 for whom the action is being performed.

As illustrated, the lockbox engine 120 comprises a request creation module 122 operable to create an access control request for elevating the operator 106 to a role that allows the operator to view or access tenant data 116. According to an aspect, the request creation module 122 determines an appropriate role corresponding to a security group that is configured with a set of permissions to run certain actions in a data center. The determination is made according to the action that the operator 106 wants to perform and the tenant 136 for whom the action is being performed. According to an aspect, the lockbox engine 120 comprises a request storage component 124 operable to store access control requests.

As illustrated in FIG. 1, the lockbox engine 120 further comprises a request authentication and authorization module 126 operable to pull an access control request from the request storage component 124, and perform authentication and authorization based on client certificates. Upon successful authentication, the request authentication and authorization module 126 is further operable to determine a correct service or workload, and to perform request validation. According to an aspect, the request authentication and authorization module 126 is operable to check a set of permission policies to determine if the access control request can be automatically approved. If the access control request can be automatically approved, the request authentication and authorization module 126 is operable to approve the request and add the requesting operator 106 into a role-based access control configuration scoped to the tenant 136 or tenant user 102. If the access control request cannot be automatically approved, the request authentication and authorization module 126 is operable to compute a set of one or more internal decision-makers or administrators 108 who have authorization to grant a temporary role elevation to the operator 106. According to an aspect, an internal administrator 108 is an individual in the operator's organization designated with authorization status according to a management hierarchy, role in the organization, or other determining factor. According to an aspect, the request authentication and authorization module 126 makes an API call to a relational database 140 to query the relational database 140 for the set of internal administrators 108 for the operator 106 and the requested role.

As illustrated, the lockbox engine 120 comprises a request notification and response module 128 operable to send the request to the one or more internal administrators 108 computed by the request authentication and authorization module 126. The request notification and response module 128 is operable to send the request via various methods, for example, the request can be sent via email, SMS text message, MMS text message, or other notification method. According to an aspect, the request comprises a link to an application interface via which an internal administrator 108 can approve or reject the request. According to another aspect, the request is provided to the one or more administrators 108 via an application interface. The one or more internal administrators 108 are enabled to log into the server 112 to approve or reject the request. According to an aspect, the request notification and response module 128 is further operable to receive a response from an internal administrator 108, and to communicate the approval or rejection of the request to the request authentication and authorization module 126.

After the request has been internally approved (e.g., by an internal administrator 108), the request authentication and authorization module 126 computes eligibility of the tenant user 102 for a second level of approval. According to an aspect, the request authentication and authorization module 126 parses a mailbox where the tenant data 116 is stored for a Boolean flag that indicates whether the tenant 136 has opted-in to the tenant lockbox feature. If the flag is set to on, the tenant 136 has opted-in to the tenant lockbox feature and permission from the tenant 136 is required for accessing the tenant's data 116. The request authentication and authorization module 126 is further operable to determine a set of decision-makers or tenant administrators 104A-N (collectively, 104) of a security group within the tenant 136 organization who are authorized to grant permission to the operator 106 to access the tenant's data 116 for performing the requested action. According to an aspect, a service administrator can delegate one or more users from the tenant 136 organization as tenant administrators 104. The request authentication and authorization module 126 is operable to query for the set of tenant administrators 104, for example, in an online directory service, and obtain contact information, such as email addresses, of the one or more tenant administrators 104.

Upon determining the one or more tenant administrators 104 for the access control request, the request notification and response module 128 is further operable to send the request to the one or more tenant administrators 104 computed by the request authentication and authorization module 126. The request notification and response module 128 is operable to send the request via various methods, for example, via email, SMS text message, MMS message, or other notification method. According to an aspect, the request comprises a link to an application interface via which a tenant administrator 104 can approve or reject the request. According to another aspect, tenant administrators 104 are enabled to log into the server 112 via an application programming interface (API) 134 to approve or reject the request. The request notification and response module 128 is further operable to receive a response from a tenant administrator 104, and to communicate the approval or rejection of the request to the request authentication and authorization module 126. According to an aspect, the request notification and response module 128 notifies the requesting operator 106 of the approval or rejection of the access control request. After the access control request has been approved by a tenant administrator 104, the request authentication and authorization module 126 is operable to add the requesting operator 106 into a role-based access control (RBAC) configuration scoped to the tenant 136 or tenant user 102, giving the operator 106 a set of permissions to access the tenant's data 116 and perform the requested actions.

As illustrated in FIG. 1, the lockbox engine 120 further comprises a record module 130 operable to create a log entry of the access control request. According to an aspect, the log entry comprises information such as, but not limited to: the requesting operator 106; a timestamp of the request; a reason for the request; whether the access control request resulted in an automatic approval; if the access control request did not result in an automatic approval; the one or more internal administrators 108 and the one or more tenant administrators 104; whether an access control request was rejected; the role temporarily assigned to the operator 106, and a record of data accessed by the requesting operator 106 while the elevated permissions were in force.

Figure 2:
FIG. 2 is an illustration of an example user interface including an access control request.

With reference now to FIG. 2, an example user interface 200 for viewing access control requests and via which an internal administrator 108 or a tenant administrator 104 can act on an access control request is shown. For example, the example user interface 200 can be exposed to an internal administrator 108 or a tenant administrator 104 via the API 134. As illustrated, the user interface 200 comprises a display of data access or access control requests 202 for an internal administrator 108 or a tenant administrator 104. According to an aspect, each access control request 202 includes a request creation timestamp 204 of the request. According to another aspect, each access control request 202 includes a reason 206 for the request. According to another aspect, each access control request 202 includes an action status 208 of the request, for example, whether the access control request 202 is pending approval or rejection or whether the access control request 202 is complete. According to another aspect, if an access control request 202 has been approved or rejected, the access control request 202 includes a request action timestamp 210, for example, a date and time of when the access control request 202 was approved or rejected. According to another aspect, each access control request 202 includes a request completion timestamp 212, for example, a date and time of when the work was completed for which the access control request 202 was created. According to another aspect, if an approval action 214 is pending, the access control request 202 includes a selectable approval action control 216 and a selectable rejection action control 218, which when selected, sends an approval or rejection response to the lockbox engine 120.

Figure 3:
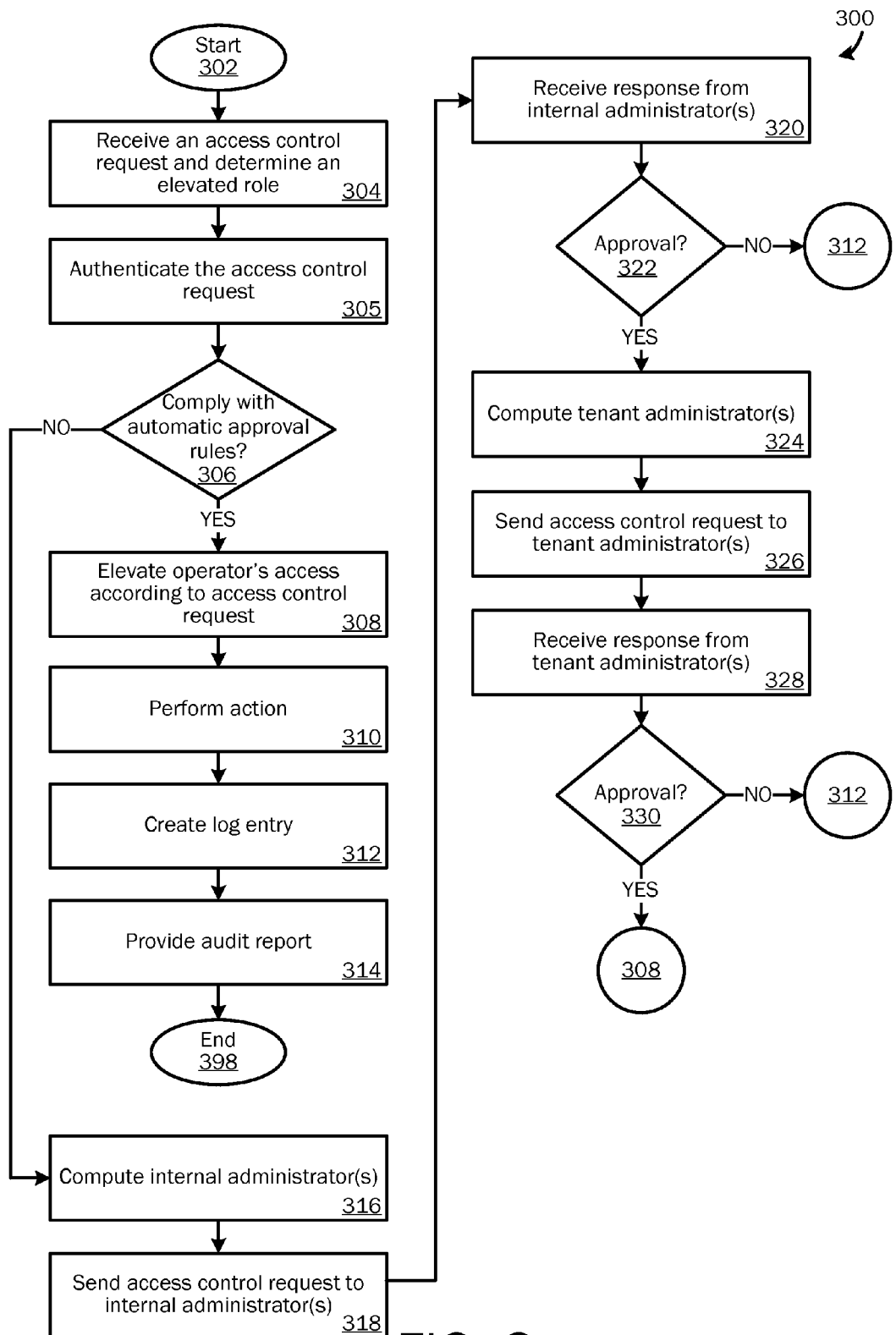
FIG. 3 is a flowchart of an example method for providing tenant approval for operator access to tenant data.

With reference now to FIG. 3, a flow chart of an example method 300 for providing tenant approval for operator access to tenant data 116 is illustrated. The method 300 starts at OPERATION 302, and advances to OPERATION 304, where an operator 106 needs authorization for accessing tenant data 116 for performing a certain action or operation, for example, to run a debugging trace on a process associated with software service 114. To protect the privacy of tenant data 116, such access may not be always available to operators 106 associated with server 112. Such operators 106 may be limited to basic access permissions, such as viewing log data or configuration information, and access to tenant data 116 is prohibited. At OPERATION 304, the request creation module 122 receives a request from an operator 106 for elevation to a role that allows the operator 106 to view or access tenant data 116 for performing the action or operation. For example, the operator 106 selects to create an access control request 202 via an administrative console or application interface. According to an aspect, the request includes a tenant identifier and a reason for accessing the tenant data 116. Upon receiving an indication to create a request for a role elevation, the request creation module 122 determines where the tenant 136 is provisioned (e.g., server forest, data center, server, etc.) via referencing a command list, determines a role corresponded to a security group that would give the operator 106 the set of permissions needed to perform the action or operation, creates an access control request 202 to temporarily elevate the operator 106 to the determined role, and stores the request 202 in a storage compartment 124.

The method 300 advances to OPERATION 305, where the request authentication and authorization module 126 authorizes the access control request 202. For example, the authentication and authorization module 126 determines a current role of the requesting operator 106 and the requested role of the operator 106, and determines whether elevation to the requested role from the current role complies with at least one of a plurality of policies associated with the lockbox engine 120.

The method 300 advances to DECISION OPERATION 306, where a determination is made as to whether the access control request 202 can be automatically approved. According to an aspect, the request authentication and authorization module 126 determines whether the access control request 202 complies with at least one of a plurality of permission policies associated with a lockbox service. For example, the access control request 202 may be checked for compliance with at least one permission policy of plurality of permission policies. According to an aspect, such policies comprise checks for factors such as a user group criterion, a security flag criterion, an action scope criterion, and a schedule criterion. For example, an operator 106 may belong to an "onsite" user group that allows greater automated elevation of permissions than an operator 106 accessing server 112 from offsite.

If a determination is made that the access control request 202 can be automatically approved at DECISION OPERATION 306, the method 300 advances to OPERATION 308, where the request authentication and authorization module 126 grants the elevated permission to the operator 106. For example, the request authentication and authorization module 126 may elevate the permissions allocated to the operator 106 in order to allow the operator 106 to perform a requested action. According to an aspect, the elevation is for a limited duration that is defined, for example, by the permission policy, by a configuration setting associated with the software service, or by a configuration setting associated with a user group. According to an aspect, such permissions may comprise a set of permissions associated with a task, such as the need to modify overall configuration data for server 112 and restart several core services (e.g., network and/or user management services) in order to install a new software service into production.

After elevating the operator's permissions at OPERATION 308, the method 300 advances to OPERATION 310, where the operator 106 performs the requested action. For example, the operator 106 may perform a debugging trace as allowed by the newly elevated permissions.

The method 300 advances to OPERATION 312, where the record module 130 creates a log entry of the access control request 202. According to an aspect, the log entry comprises information about whether the access control request 202 resulted in automatic approval of elevation of the operator's 106 permissions. According to another aspect, the log entry further comprises a record of the role to which the operator 106 was temporarily elevated and the tenant data 116 accessed by the operator 106 while the elevated permissions were in force.

The method 300 advances to OPERATION 314, where the record module 130 provides an audit report. For example, an administrator or tenant 136 personnel (e.g., tenant user 102, tenant administrator(s) 104, etc.) may be provided with an audit report comprising a list of all operators 106 who have been granted elevated permissions that allow access to tenant data 116.

Referring back to DECISION OPERATION 306, if the access control request 202 is determined not to comply with the permission policies for automatic approval, the method 300 advances to OPERATION 316, where the request authentication and authorization module 126 computes a set of internal administrators 108 in an organizational hierarchy of the operator 106 who are authorized to grant a temporary role elevation to the operator 106. According to an aspect, the request authentication and authorization module 126 determines the set of one or more internal administrators 108 for the access control request 202 according to the requesting operator 106, the role requested by the operator 106, and the schedules and rotations of the operator's administrators 108.

The method 300 advances to OPERATION 318, where the record module 130 sends the access control request 202 to the one or more internal administrators 108. For example, the access control request 202 is sent to the one or more internal administrators 108 via an email, a text message, notification, or via an application interface. The method 300 advances to OPERATION 320, where the request notification and response module 128 receives a response from one of the one or more internal administrators 108. For example, an internal administrator 108 may accept or reject an access control request 202 via a selection of the approval action control 216 or the rejection action control 218 displayed in the user interface 200 as illustrated in FIG. 2.

At DECISION OPERATION 322, a determination is made as to whether the response is an approval or a rejection of the access control request 202. If the response is a rejection, the method 300 advances to OPERATION 312, where a log entry is made of the access control request 202 being sent for administrator approval and of the received rejection. If the response is an approval, the method 300 advances to OPERATION 324, where the request authentication and authorization module 128 computes a set of one or more tenant administrators 104 within the tenant 136 organization who are authorized to grant permission to allow the operator 106 access to the tenant's data 116. For example, a tenant administrator 104 may be delegated by a service administrator, may be a manager of the tenant user 102, etc. According to an aspect, the request authentication and authorization module 128 obtains contact information, such as email addresses, of the one or more tenant administrators 104 from an online directory service.

The method 300 advances to OPERATION 326, where the request notification and response module 128 sends the access control request 202 to the one or more tenant administrators 104. For example, the access control request 202 is sent to the one or more tenant administrators 104 via an email, a text message, notification, or via an application interface. According to an aspect, the access control request 202 includes a reason for accessing the tenant data 116.

The method 300 advances to OPERATION 328, where the request notification and response module 128 receives a response from one of the one or more tenant administrators 104. For example, a tenant administrator 104 may accept or reject an access control request 202 via a selection of the approval action control 216 or the rejection action control 218 displayed in the user interface 200 as illustrated in FIG. 2.

At DECISION OPERATION 330, a determination is made as to whether the response is an approval or a rejection of the access control request 202. If the response is a rejection, the method 300 advances to OPERATION 312, where a log entry is made of the access control request 202 being sent for tenant approval and of the received rejection. If the response is an approval, the method 300 advances to OPERATION 308, where the request authentication and authorization module 126 temporarily elevates the operator 106 to the requested role, granting elevated permissions to the operator 106 for performing the requested action.

The method 300 advances to OPERATION where the operator 106 performs the requested action. For example, the operator 106 may perform a debugging trace as allowed by the newly elevated permissions.

The method 300 advances to OPERATION 312, where the record module 130 creates a log entry of the access control request 202. According to an aspect, the log entry comprises information about whether the access control request 202 resulted in approval of elevation of the operator's 106 permissions via the internal administrator 108 and the tenant administrator 104. According to an aspect, the log entry further comprises a record of the role to which the operator 106 was temporarily elevated and tenant data 116 accessed by the operator 106 while the elevated permissions were in force.

The method 300 advances to OPERATION 314, where the record module 130 provides an audit report. For example, an administrator or tenant 136 personnel (e.g., tenant user 102, tenant administrator(s) 104, etc.) may be provided with an audit report comprising a list of all operators 106 who have been granted elevated permissions that allow access to tenant data 116. The method 300 ends at OPERATION 398.

Aspects of the present disclosure provide a computer-implemented method, system, and computer-readable medium for providing tenant approval for operator access to a tenant's data. Aspects of the tenant lockbox system receive an indication to create an access control request for temporarily elevating a role of an operator to a security group giving the operator a set of permissions for allowing the operator to perform an action on behalf of the tenant and to enable operator access to the tenant's data; create the access control request for temporarily elevating the role of the operator; compute a set of one or more internal administrators authorized to grant a first set of permissions to temporarily elevate the role of the operator; send the access control request to the one or more internal administrators; receive an access control response from one of the one or more internal administrators; determine whether the access control response from the internal administrator is an approval or a rejection of the access control request; upon determining that the access control response from the internal administrator is an approval of the access control request, grant the first set of permissions to temporarily elevate the role of the operator; compute a set of one or more tenant administrators authorized to grant a second set of permissions to temporarily elevate the role of the operator; send the access control request to the one or more tenant administrators; receive an access control response from one of the one or more tenant administrators; determine whether the access control response from the tenant administrator is an approval or a rejection of the access control request; upon determining that the access control response from the tenant administrator is an approval of the access control request, grant the second set of permissions to temporarily elevate the role of the operator; and temporarily elevate the role of the operator to the security group giving the operator the set of permissions for allowing the operator to perform the action on behalf of the tenant and to enable operator access to the tenant's data.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which aspects of the invention are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
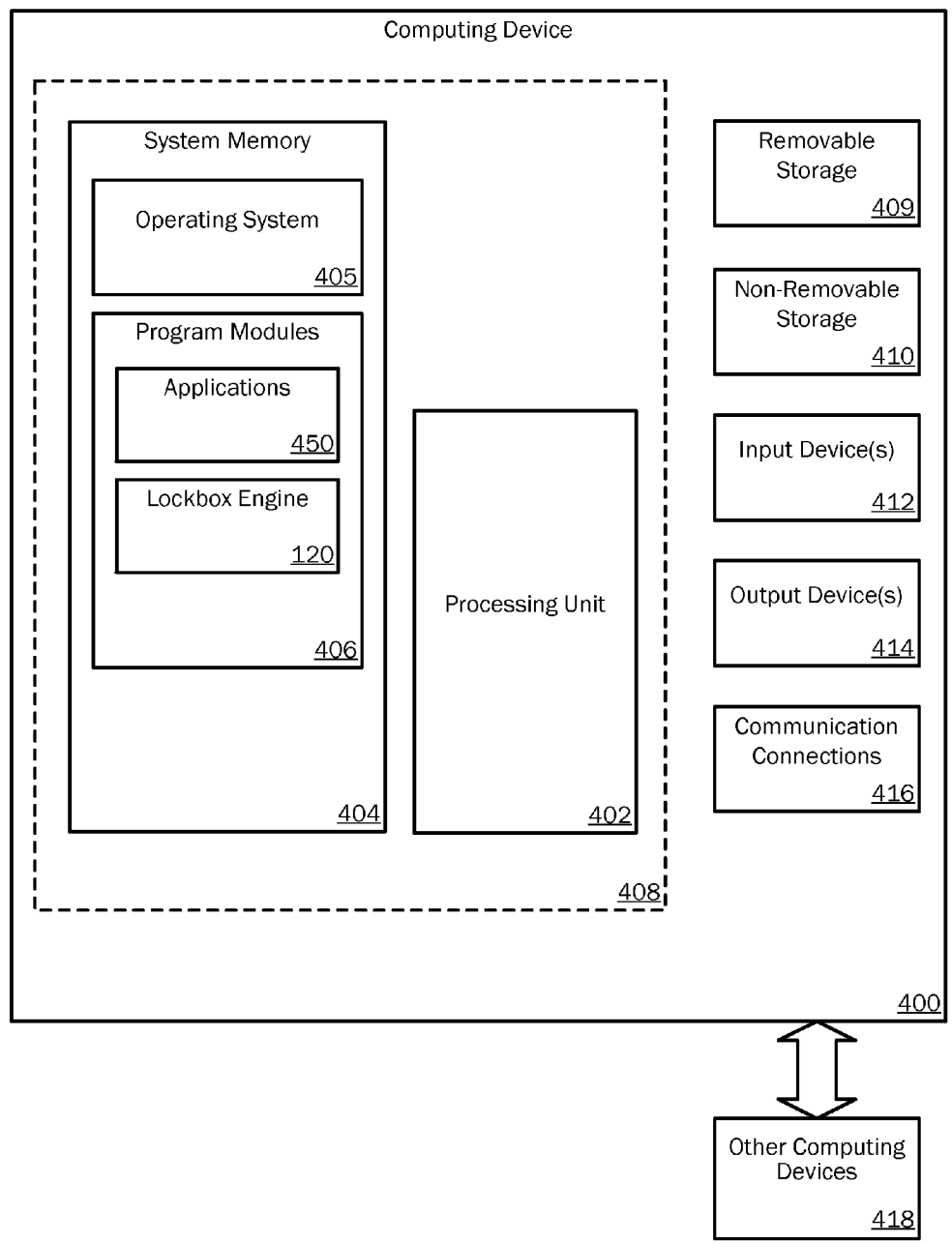
FIG. 4 is a block diagram illustrating example physical components of a computing device with which aspects of the invention may be practiced.
Figure 5A:
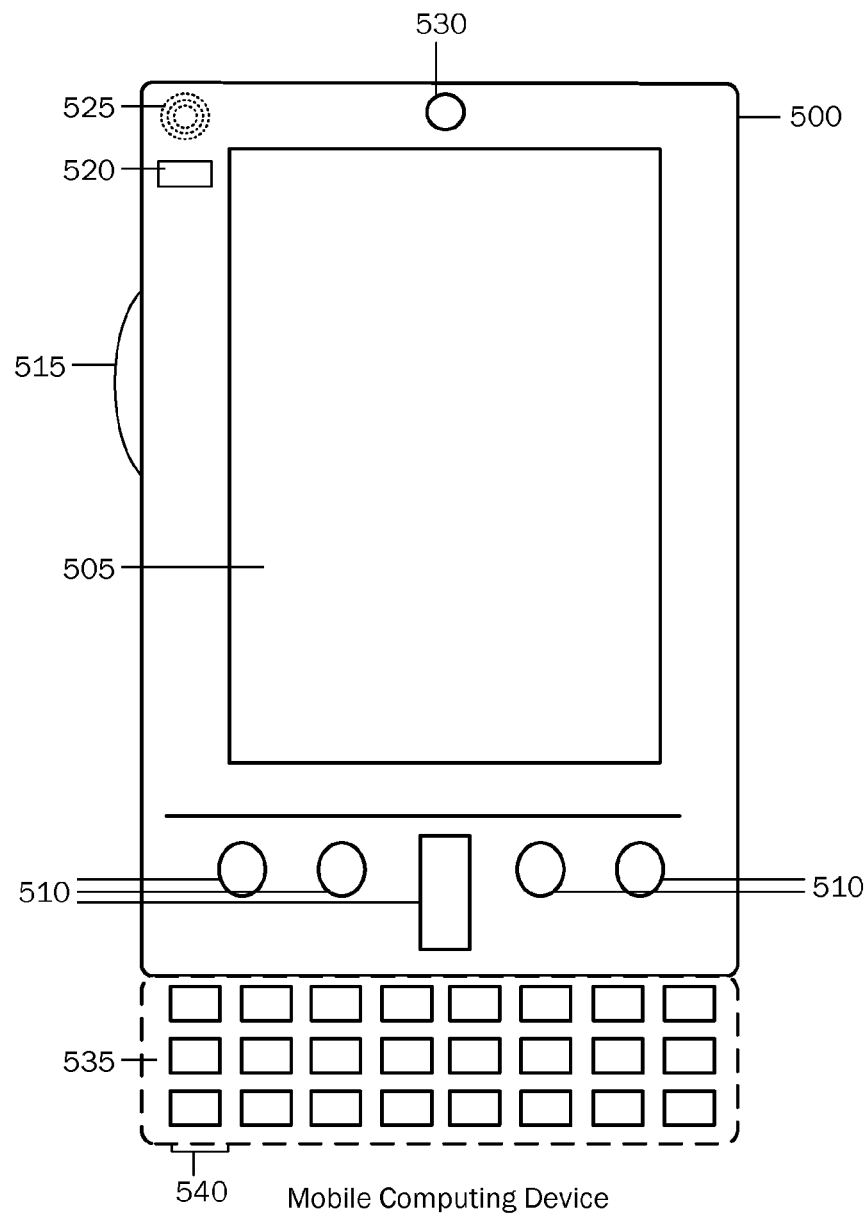
FIGS. 5A and 5B are simplified block diagrams of a mobile computing device with which aspects of the present invention may be practiced.
Figure 5B:
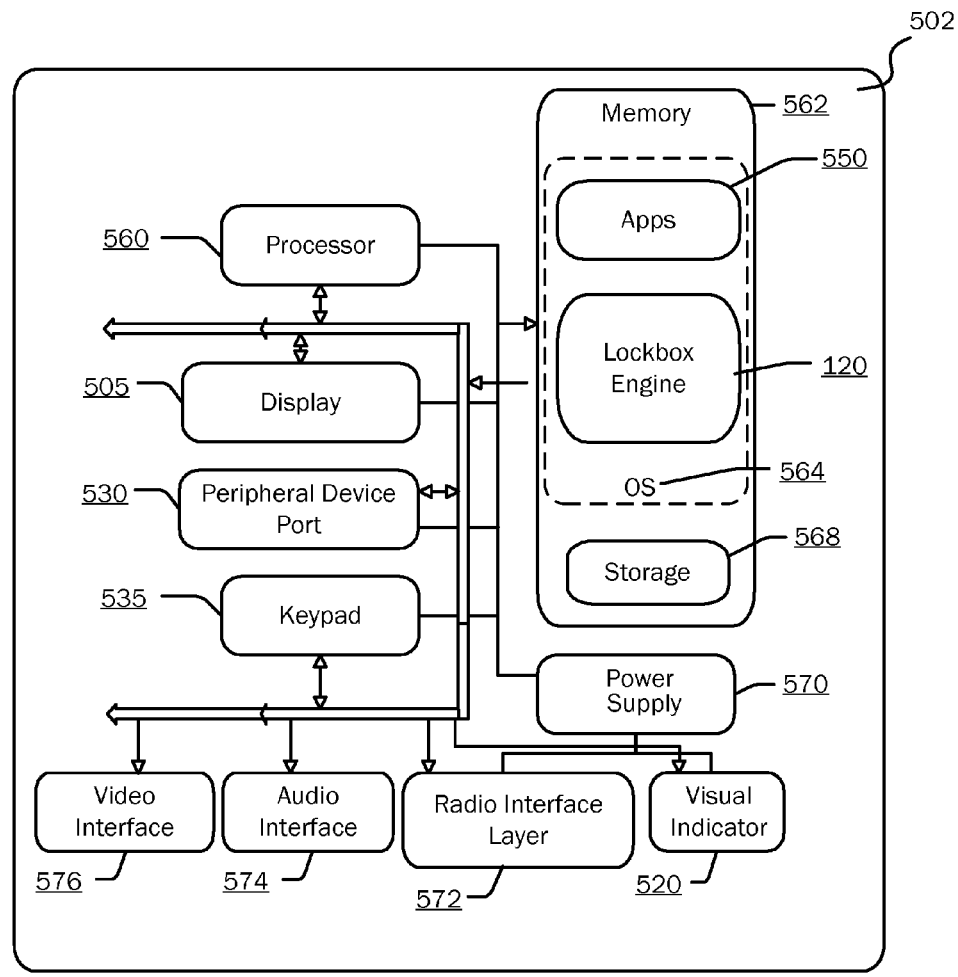
Figure 6:
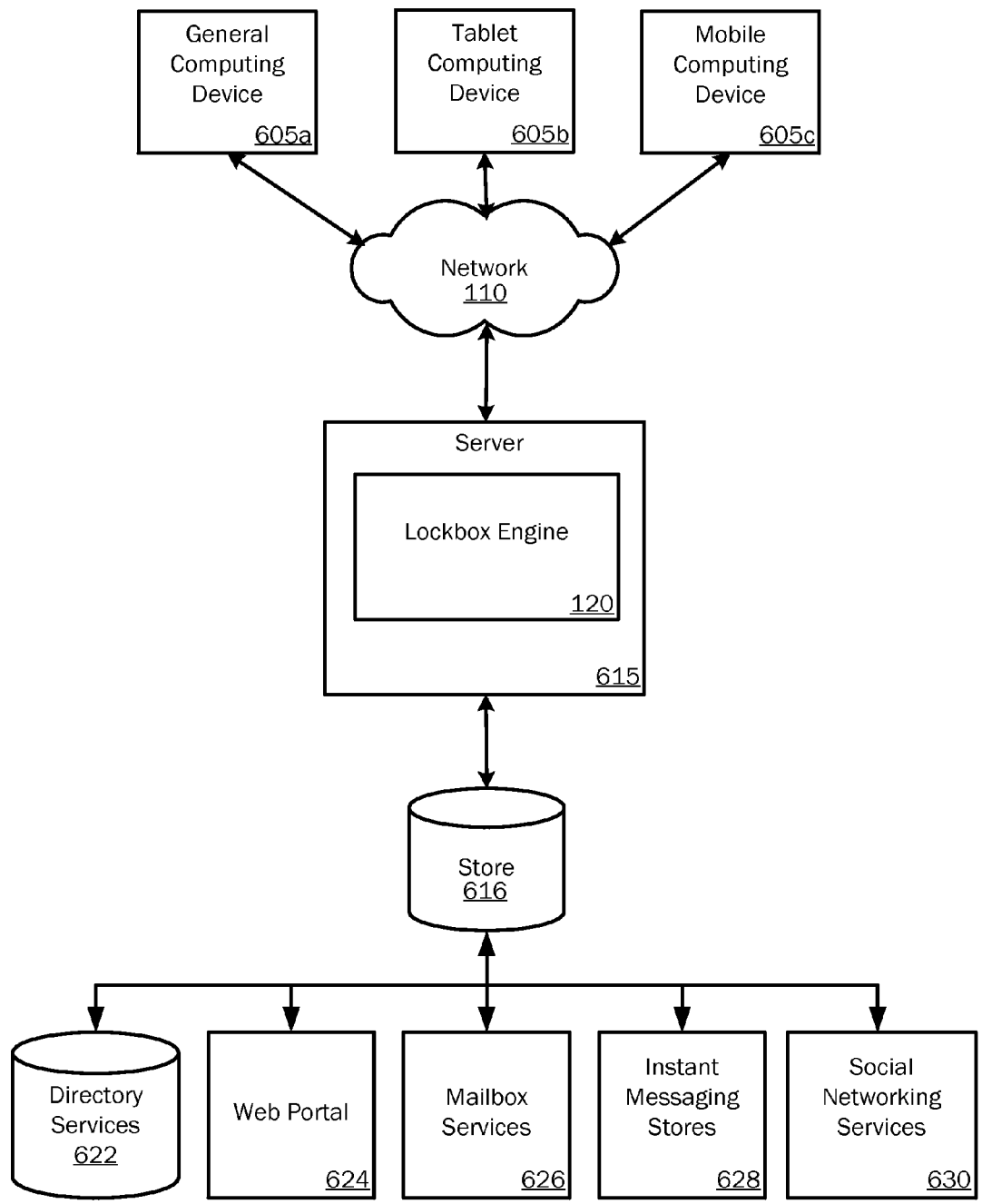
FIG. 6 is a simplified block diagram of a distributed computing system in which aspects of the present invention may be practiced.

FIG. 4-6 and the associated descriptions provide a discussion of a variety of operating environments in which examples of the invention are practiced. However, the devices and systems illustrated and discussed with respect to FIGS. 4-6 are for purposes of example and illustration and are not limiting of a vast number of computing device configurations that are utilized for practicing aspects of the invention, described herein.

FIG. 4 is a block diagram illustrating physical components (i.e., hardware) of a computing device 400 with which examples of the present disclosure are be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more programming modules 406 suitable for running software applications 450. According to an aspect, the system memory 404 includes the lockbox engine 120. The operating system 405, for example, is suitable for controlling the operation of the computing device 400. Furthermore, aspects of the invention are practiced in conjunction with a graphics library, other operating systems, or any other application program, and is not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., lockbox engine 120) performs processes including, but not limited to, one or more of the stages of the method 300 illustrated in FIG. 3. According to an aspect, other program modules are used in accordance with examples of the present invention and include applications such as electronic mail and contacts applications, word processing applications, spreadsheet applications, database applications, slide presentation applications, drawing or computer-aided application programs, etc.

According to an aspect, aspects of the invention are practiced in an electrical circuit comprising discrete electronic elements, packaged or integrated electronic chips containing logic gates, a circuit utilizing a microprocessor, or on a single chip containing electronic elements or microprocessors. For example, aspects of the invention are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects of the invention are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects of the invention may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or less input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, the lockbox engine 120 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 is stored locally on the mobile computing device 500, as described above. According to another aspect, the data is stored on any number of storage media that is accessible by the device via the radio 572 or via a wired connection between the mobile computing device 500 and a separate computing device associated with the mobile computing device 500, for example, a server computer in a distributed computing network, such as the Internet. As should be appreciated such data/information is accessible via the mobile computing device 500 via the radio 572 or via a distributed computing network. Similarly, according to an aspect, such data/information is readily transferred between computing devices for storage and use according to well-known data/information transfer and storage means, including electronic mail and collaborative data/information sharing systems.

FIG. 6 illustrates one example of the architecture of a system for providing tenant approval for operator access to tenant data 116 as described above. Content developed, interacted with, or edited in association with the lockbox engine 120 is enabled to be stored in different communication channels or other storage types. For example, various documents may be stored using a directory service 622, a web portal 624, a mailbox service 626, an instant messaging store 628, or a social networking site 630. The lockbox engine 120 is operable to use any of these types of systems or the like for providing tenant approval for operator access to tenant data, as described herein. According to an aspect, a server 615 provides the lockbox engine 120 to clients 605A,B,C. As one example, the server 615 is a web server providing the lockbox engine 120 over the web. The server 615 provides the lockbox engine 120 over the web to clients 605 through a network 110. By way of example, the client computing device is implemented and embodied in a personal computer 605A, a tablet computing device 605B or a mobile computing device 605C (e.g., a smart phone), or other computing device. Any of these examples of the client computing device are operable to obtain content from the store 616.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A computer-implemented method for providing tenant approval for operator access to a tenant's data, comprising:
   receiving an indication to create an access control request for temporarily elevating a role of an operator to a security group giving the operator a set of permissions for allowing the operator to perform an action on behalf of the tenant and to enable operator access to the tenant's data;

creating the access control request for temporarily elevating the role of the operator;
computing a set of one or more internal administrators authorized to grant a first set of permissions to temporarily elevate the role of the operator;
sending the access control request to the one or more internal administrators;
receiving an access control response from one of the one or more internal administrators;
determining whether the access control response from the internal administrator is an approval or a rejection of the access control request;
upon determining that the access control response from the internal administrator is an approval of the access control request, granting the first set of permissions to temporarily elevate the role of the operator;
computing a set of one or more tenant administrators authorized to grant a second set of permissions to temporarily elevate the role of the operator, wherein the one or more tenant administrators are associated with an organization of the tenant;
sending the access control request to the one or more tenant administrators;
receiving an access control response from one of the one or more tenant administrators;
determining whether the access control response from the tenant administrator is an approval or a rejection of the access control request;
upon determining that the access control response from the tenant administrator is an approval of the access control request, granting the second set of permissions to temporarily elevate the role of the operator; and
temporarily elevating the role of the operator to the security group giving the operator the set of permissions for allowing the operator to perform the action on behalf of the tenant and to enable operator access to the tenant's data.

2. The computer-implemented method of claim 1, wherein receiving the indication to create the access control request for temporarily elevating the role of the operator to the security group giving the operator the set of permissions for allowing the operator to perform the action on behalf of the tenant and to enable operator access to the tenant's data comprises receiving an identification of the tenant, the operator, and the action.

3. The computer-implemented method of claim 2, wherein creating the access control request for temporarily elevating the role of the operator comprises determining the security group that would give the operator the set of permissions needed to allow the operator to perform the action based at least in part on the tenant, the operator, and the action.

4. The computer-implemented method of claim 3, wherein determining the security group that would give the operator the set of permissions needed to allow the operator to perform the action comprises:
referencing a command list to derive, based on the tenant, at which server forest, data center, and server the tenant is provisioned; and
determining, based on the server forest, data center, and server and based on the operator and the action, the security group and corresponding role that would give the operator the set of permissions needed to allow the operator to perform the action.

5. The computer-implemented method of claim 4, further comprising authenticating the access control request prior to computing the set of one or more internal administrators authorized to grant a first set of permissions to temporarily elevate the role of the operator, wherein authenticating the access control request comprises:
determining a current role of the operator; and
determining whether elevation to the security group and corresponding role from the current role complies with at least one of a plurality of policies.

6. The computer-implemented method of claim 1, wherein computing the set of one or more tenant administrators authorized to grant a first set of permissions to temporarily elevate the role of the operator comprises querying an online directory service for the one or more tenant administrators, and obtaining contact information for the one or more tenant administrators.

7. The computer-implemented method of claim 1, wherein at least one of the one or more tenant administrators is a user in the tenant organization delegated by an administrator of a software service as a tenant administrator.

8. The computer-implemented method of claim 1, wherein prior to computing a set of one or more tenant administrators authorized to grant the second set of permissions to temporarily elevate the role of the operator:
making an analytics call to determine whether the tenant has opted in to requiring tenant approval for operator access to the tenant's data; and
receiving a response including a Boolean flag indicating that the tenant requires tenant approval for operator access to the tenant's data.

9. The computer-implemented method of claim 1, wherein sending the access control request to the one or more tenant administrators comprises sending a link to an application interface via which the one or more tenant administrators is enabled to approve or reject the access control request, wherein the link is sent in at least one of:
an email;
an SMS;
an MMS message and
a notification.

10. The computer-implemented method of claim 1, wherein receiving the access control response from one of the one or more tenant administrators comprises receiving an indication of a selection of an approval control or a rejection control provided in an application user interface.

11. The computer-implemented method of claim 1, further comprising notifying the operator that the access control response from the tenant administrator is an approval of the access control request.

12. The computer-implemented method of claim 1, further comprising creating a log entry comprising the operator, the action, the security group and corresponding role to which the operator has been temporarily elevated, and the tenant data accessed by the operator.

13. The computer-implemented method of claim 1, further comprising providing an audit report comprising a plurality of log entries.

14. A system for providing tenant approval for operator access to a tenant's data, the system comprising:
one or more processors;
memory storing one or more computer-executable instructions that when executed by the one or more processors, cause the system to:
receive an indication to create an access control request for temporarily elevating a role of an operator to a security group giving the operator a set of permissions for allowing the operator to perform an action on behalf of the tenant and to enable operator access to the tenant's data; and create the access control request for temporarily elevating the role of the operator;

authenticate the access control request;

compute a set of at least one internal administrator authorized to grant a first set of permissions to temporarily elevate the role of the operator, wherein the set of the at least one internal administrator is associated with an organization of the tenant;

receive an access control response from an internal administrator of the set of the at least one internal administrator;

determine whether the access control response from the internal administrator is an approval or a rejection of the access control request;

upon determining that the access control response from the internal administrator is an approval of the access control request, grant the first set of permissions to temporarily elevate the role of the operator; and compute a set of at least one tenant administrator authorized to grant a second set of permissions to temporarily elevate the role of the operator; and send the access control request to the at least one internal administrator;

receive the access control response from the internal administrator;

send the access control request to the at least one tenant administrator; and receive an access control response from a tenant administrator of the set of at least one tenant administrator.

15. The system of claim 14, wherein the system is further operable to:

determine whether the access control response from the tenant administrator is an approval or a rejection of the access control request;

upon determining that the response from the tenant administrator is an approval of the access control request, grant the second set of permissions to temporarily elevate the role of the operator; and temporarily elevate the role of the operator to the security group giving the operator the set of permissions for allowing the operator to perform the action on behalf of the tenant and to enable operator access to the tenant's data.

16. The system of claim 15, wherein the system is further operable to:

reference a command list to derive, based on the tenant, at which server forest, data center, and server the tenant is provisioned; and determine, based on the server forest, data center, and server and based on the operator and the action, the security group and corresponding role that would give the operator the set of permissions needed to allow the operator to perform the action.

17. The system of claim 16, wherein in authenticating the access control request, the system is further operable to:

determine a current role of the operator; and determine whether elevation of the role to the security group from the current role complies with at least one of a plurality of policies.

18. The system of claim 14, further comprising:

create a log entry comprising the operator, the requested action, the granted temporary role elevation for performing the requested action, and the tenant's data accessed by the operator; and provide an audit report comprising a plurality of log entries.

19. A computer storage device storing computer-useable instructions that, when executed by one or more processors, cause one or more computing devices to perform a method for providing tenant approval for operator access to a tenant's data, the method comprising:

receiving an indication to create an access control request for temporarily elevating a role of an operator to a security group giving the operator a set of permissions for allowing the operator to perform an action on behalf of the tenant and to enable operator access to the tenant's data;

determining the security group that would give the operator the set of permissions needed to allow the operator to perform the action;

creating the access control request for temporarily elevating the role of the operator;

authenticating the access control request, wherein authenticating the access control request comprises determining a current role of the operator, and determining whether elevation to the role corresponding to the determined security group from the current role complies with at least one of a plurality of policies;

generating a set of at least one internal administrator authorized to grant a first set of permissions to temporarily elevate the role of the operator, wherein the at least one internal administrator is associated with an organization of the tenant;

sending the access control request to the at least one internal administrator;

receiving an access control response from one internal administrator of the set of at least one internal administrator;

determining whether the access control response from the internal administrator is an approval or a rejection of the access control request;

upon determining that the access control response from the internal administrator is an approval of the access control request:

granting a first set of permissions to temporarily elevate the role of the operator;

generating a set of at least one tenant administrator authorized to grant a second set of permissions to temporarily elevate the role of the operator;

sending the access control request to the at least one tenant administrator;

receiving an access control response from one tenant administrator of the set of at least one tenant administrator;

determining whether the access control response from the tenant administrator is an approval or a rejection of the access control request; and upon determining that the response from the tenant administrator is an approval of the access control request:

granting the second set of permissions to temporarily elevate the role of the operator; and temporarily elevating the role of the operator to the security group giving the operator the set of permissions for allowing the operator to perform the action on behalf of the tenant and to enable operator access to the tenant's data.

20. The computer storage device of claim 19, further comprising:

upon determining that the access control response from the tenant administrator is a rejection of the access control request:

creating a log entry comprising the operator, the action, the tenant administrator, and the rejection by the tenant administrator of the access control request; and notifying the operator of the rejection.

* * * * *